Oct. 24, 1933.  E. PRESTINARI  1,932,283
BRACELET CHAIN
Filed July 22, 1932
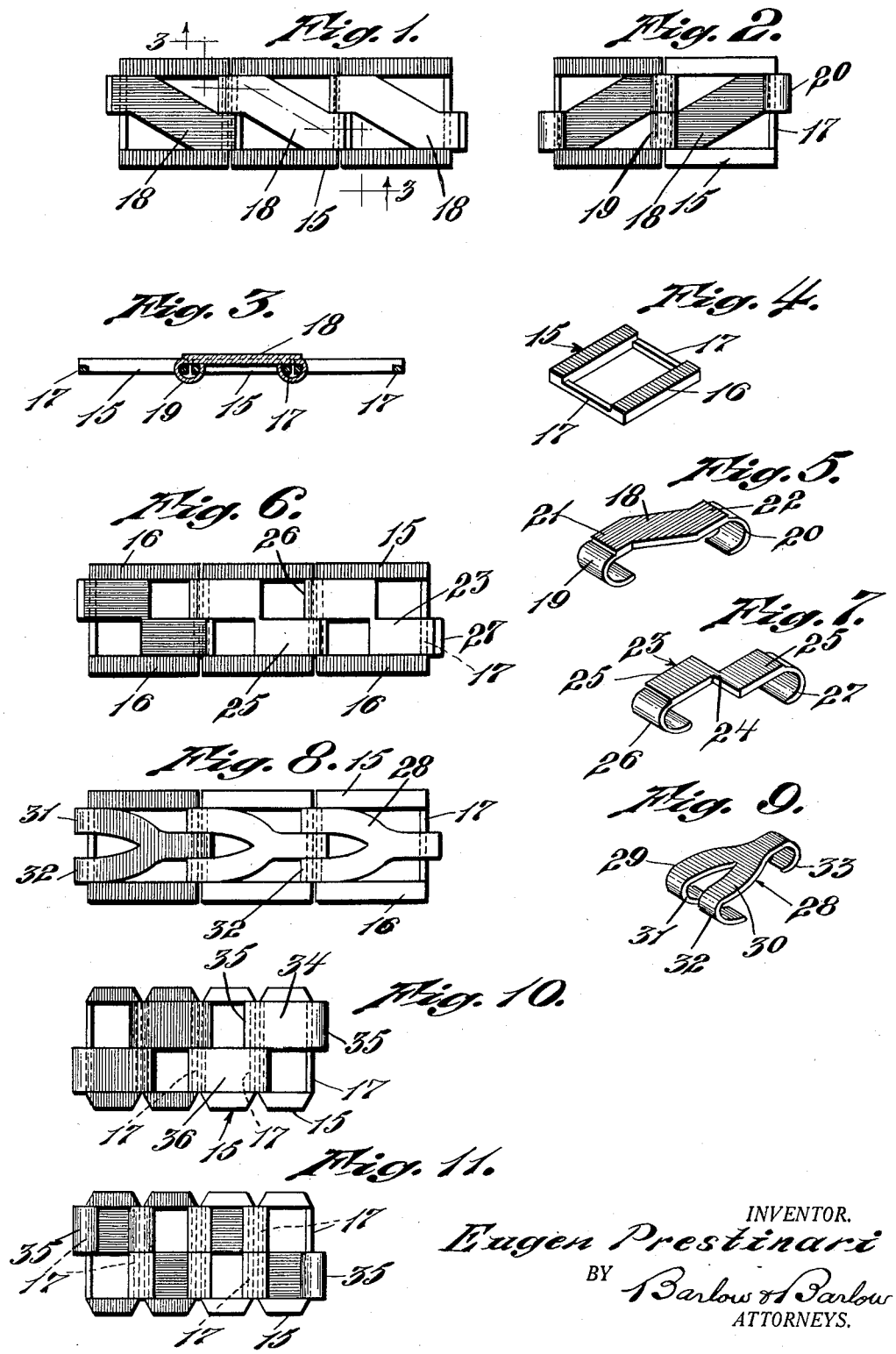
INVENTOR.
Eugen Prestinari
BY Barlow & Barlow
ATTORNEYS.

Patented Oct. 24, 1933

1,932,283

UNITED STATES PATENT OFFICE 1,932,283

BRACELET CHAIN

Eugen Prestinari, Summit, N. J., assignor to Gemex Company, a corporation of New Jersey Application July 22, 1932. Serial No. 623,916

8 Claims. (Cl. 59—80)

This invention relates to a bracelet chain and has for one of its objects to provide a construction which may be formed into a plurality of different appearances by the use of the same body links with various forms of connecting links.

Another object of the invention is the provision of a connecting link which will embrace a portion of the cross bars of the body links at one of its ends and will embrace a portion of the body link out of line therewith at its other end with two of such connecting links combining to form the complete hinge joint between any two adjacent body links.

Another object of the invention is the provision of an ornamental chain of a minimum number of parts with the parts so designed and connected that they will cause the chain to maintain its proper alignment.

A further object of the invention is the provision of a hinge joint between the body links which will be partially carried by one of the body links and partially carried by the other body link.

A still further object of the invention is the provision of a chain which will be flexible by reason of the construction of its parts with a smooth hinge action between its parts.

With these and other objects in view, the invention consists of certain novel features of construction, as will be more fully described, and particularly pointed out in the appended claims.

In the accompanying drawing:—

Fig. 1 is a top plan view of the bracelet chain formed in accordance with this invention.

Fig. 2 is a bottom plan view thereof.

Fig. 3 is a section on line 3—3 of Fig. 1.

Fig. 4 is a perspective view of the body link.

Fig. 5 is a perspective view of the connecting link shown in Figs. 1 and 2.

Fig. 6 is a top plan view of a modified form of chain using the same body link but with a modified form of connecting link.

Fig. 7 is a perspective view of the modified form of connecting link shown in Fig. 6.

Fig. 8 is a top plan view of a further modified construction of chain.

Fig. 9 is a perspective view of the connecting link shown in the modification of Fig. 8.

Fig. 10 is a top plan view of a further modified form of chain.

Fig. 11 is a bottom plan view of the construction shown in Fig. 10.

In the use of bracelet chains it is desirable to provide for different appearances of chain to appeal to different style interests and to harmonize with different shaped watches, where used as a watch bracelet, and it is also desirable to provide a very flexible chain which will be maintained in alignment at its hinge connection and will be secure, not be easily broken or accidentally detached one link from the other, and in order to accomplish these results I have provided a generally rectangular body link and a plurality of different shapes of connecting links which are superimposed upon the body links and folded about the cross bars of the body links in positions out of line so that the general extent of the connecting link across the body link is diagonal or zig-zag as desired; and the following is a detailed description of the present embodiment of this invention illustrating the preferred means by which these advantageous results may be accomplished.

With reference to the drawing, 15 designates the body link which is formed of two relatively heavy side bars 16 and two thinner end bars 17 connecting these side bars at either end. The connecting link shown in Figs. 1, 2 and 3 consists of a body part 18 superimposed on and arranged to extend diagonally across the body link 15 with an end portion 19 folded about the cross bars 17 of two adjacent links at one side of the chain and the opposite end portion 20 folded about the cross bars 17 at the other end of the link on which it is superimposed and at the other side of the chain, as shown in Fig. 2. The width of the portions 19 and 20 are together the width or span of the cross bars 17 so that when two such links 18 have their oppositely disposed ends folded about the same cross bars 17 they will fill up the space between side bars 16 and cause the links of the chain to maintain their proper desired arrangement and yet permit of flexibility of the links. The diagonal body portion of this connecting link is provided with straight portions 21 and 22 to engage the inner straight adjacent side bars 16 as will be apparent in the figures described, and this single connecting link, by reason of this diagonal arrangement, serves to prevent lateral movement and align the body links without itself extending across the full length of the cross bars 17.

In Figs. 6 and 7, the connecting link 23, instead of being diagonally disposed, such as shown in Fig. 5, is of a zig-zag shape connected by a thin neck 24 with block portions 25 disposed upon opposite sides and at opposite ends of each of the body links by being of such relative width as to be substantially one-half of the space between the side bars 16 of the body links so that the proper aligned relation of the body links may be had in a manner similar to that above pointed out.

In Fig. 9 I have illustrated a still further modified construction in which the connecting link 28 is in the form of a Y with its bifurcated portions 29 and 30 formed with bendable ends 31 and 32 to embrace the cross bars 17 of the body links and with its single portion 33 folded about the cross bars 17 between the branches 29 and 30 of the Y. The proportions of this connecting link relative to the body are such that the three parts 29, 30 and 33, when in this interlocking relation as shown in Fig. 8, will substantially be the width of the space between the bars 16 and the alignment of the body links when assembled is similarly secured.

In Figs. 10 and 11 the connecting links are modified so that one connecting link extends the entire length of the body link in longitudinal straight alignment. In this case the connecting link 34 is superimposed upon the body link and its end portions 35 are folded about the cross bars 17 of one half their width and a separate connecting link 36 is folded about the remaining portions of the cross bars 17 with each out of line, connecting links 34 and 36 superimposed upon different body links of the chain, and in this construction, in order that the joint be aligned and complete, the connecting links are oppositely arranged or staggered rather than similarly arranged on each body link and the connecting link itself bent out of line to form the staggered arrangement as heretofore above pointed out.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. A bracelet chain comprising a series of body links having cross bars at their ends, and connecting links each extending over the length of a body link with one of its ends folded about two adjacent end cross bars of the body links, the top surface of said end cross bars being lower than the surface of the longitudinally extending portion of the top links to obtain a more nearly flush top surface at this point.

2. A bracelet chain comprising a series of body links having cross bars at their ends, and connecting links each extending over the length of a body link with each of its ends folded about a separate pair of adjacent end cross bars of the body links.

3. A bracelet chain comprising a series of body links having cross bars at their ends, and connecting links each extending over the length of a body link, each having its ends out of longitudinal line and folded about spaced pairs of adjacent end cross bars of the body links.

4. A bracelet chain comprising a series of body links having cross bars at their ends, and connecting links each extending over the length of a body link each having its ends out of longitudinal line and folded about spaced pairs of adjacent end cross bars of the body links, and with its opposite sides engaging the inner surfaces of the side bars of a body link.

5. A bracelet chain comprising a series of generally rectangular body links, having cross bars at their ends, a connecting link arranged generally diagonally across each body link with its ends each folded about a separate pair of cross bars of two adjacent body links.

6. A bracelet chain comprising a series of generally rectangular body links, having cross bars at their ends, a connecting link arranged generally diagonally across each body link with its ends each folded about a separate pair of cross bars of two adjacent body links, and with its opposite sides engaging the inner surfaces of the side bars of a body link.

7. A bracelet chain comprising a series of body links, connecting links each of a length longer than a body link disposed to cover a portion of the body links inwardly from the side edges thereof with portions extending beyond the ends thereof and embracing end portions of the body link which it covers and the next body link to hingedly connect them together, the top surface of said embraced portions being lower than the top surface of the longitudinally extending portions of the body link to obtain a more nearly flush outer surface at this point.

8. A bracelet chain comprising a series of generally rectangular body links, having cross bars at their ends, a connecting link on each body link having spaced portions at one end folded about a pair of adjacent cross bars of the body links and a single portion at the other end of the connecting link similarly folded about the opposite pair of adjacent cross bars, said single portion fitting between said spaced portions of the next adjacent connecting link.

EUGEN PRESTINARI.